United States Patent [19]

Heinrich et al.

[11] 4,105,558
[45] Aug. 8, 1978

[54] APPARATUS FOR DRAINING OF MUDDY LIQUIDS

[76] Inventors: Hans J. Heinrich, Wilhelmshoherstr. 129, 5828 Ennepetal; Bernd Koslowsky, Theodor-Heuss-Str. 50; Egon Hoffmann, Funckstr. 63, both of 56 Wuppertal 1, all of Germany

[21] Appl. No.: 746,680

[22] Filed: Dec. 2, 1976

Related U.S. Application Data

[62] Division of Ser. No. 656,181, Feb. 9, 1976, abandoned.

[30] Foreign Application Priority Data

Nov. 28, 1975 [DE] Fed. Rep. of Germany ....... 2515162

[51] Int. Cl.² .......................... C02C 3/00; B01D 3/14
[52] U.S. Cl. .................................... 210/199; 210/202; 210/216; 210/401
[58] Field of Search .................. 210/10, 73 R, 735 G, 210/216, 400, 199, 201–203, 205, 208, 219, 401

[56] References Cited

U.S. PATENT DOCUMENTS

| 3,531,404 | 9/1970 | Goodman et al. | 210/400 |
| 3,800,952 | 4/1974 | Bastgen | 210/400 |
| 3,951,809 | 4/1976 | Kollmar | 210/400 |

*Primary Examiner*—Thomas G. Wyse

[57] ABSTRACT

Apparatus for draining of muddy liquids, especially of sludges and slurries in sewage clarification plants, where first of all an ionic coagulant, eg., an anionic or cationic coagulating agent, is added to the muddy liquid in a first ionic coagulating means to obtain an aqueous sludge which is separated from the muddy liquid in a first coagulating chamber by sedimentation in a straining zone and wherein the aqueous sludge is subsequently filtered and pressed, whereafter the liquid is treated in a second coagulating or mixing chamber.

The apparatus to carry out the process comprises in addition to the first coagulation chamber coagulation chamber for the muddy liquid, a revolving screening belt constituting the filtering means for the straining zone and a series connected screen belt press which aids in dewatering the filtered solids. This apparatus second coagulation chamber is located at the delivery end of the screening belt and constitutes the straining zone for the addition of the ionic coagulant of opposite charge to the aqueous slurry and includes the mixing chamber which has a slit outlet lying transversely above the receiving screen belt of the screen belt press whereby the dried filter cake leaves the screen belt press to provide as complete as possible transfer of the slurry cake from the revolving screen belt and belt press.

5 Claims, 3 Drawing Figures

APPARATUS FOR DRAINING OF MUDDY LIQUIDS

This is a division, of application Ser. No. 656,181, filed Feb. 9, 1976, now abandoned.

CROSS-REFERENCE TO RELATED APPLICATIONS

Applicants hereby make reference to their German patent application No. P 25 15 162.6 in the Federal Republic of Germany filed Apr. 8, 1975 in the name of the assignee of the present application, Ritterhaus and Blecher GmbH, 56 Wuppertal 2, Wittensteinstrasse 8-10, Federal Republic of Germany and priority under this cited German application is claimed under the provisions of 35 U.S.C. 119.

BACKGROUND OF THE INVENTION (1) Field of the Invention

The invention relates to a process and apparatus for draining of muddy liquids, especially of sludges and slurries in sewage clarification plants, where first of all, an anionic or cationic coagulating agent is added to the muddy liquid by sedimentation in a straining zone and subsequently the aqueous sludge is filtered while pressed.

(2) Description of the Prior Art (a) Addition of Coagulating Agent

In the case of draining or purifying of muddy liquids and especially in the case of purification of sewage, it has been known to use a coagulant for the separation of non depositable and suspended solids and of colloidally suspended substances. Since the suspended substances and particules of colloids to be separated have a similar electric charge on their surface to the aqueous environment, they themselves cannot coagulate on to larger particles which are capable of sedimentation. In the case of the addition of a coagulant agent which has a charge, opposite in sign to the charge on the particles that are to be separated, the particle solids that are to be added to accumulate on the coagulation agent form large units which are capable of sedimentation.

(b) Commercially Available Coagulants

These known coagulation agents consist of long, straight chain of chain molecules, and in particular synthetic polymerisates based on polyacrylic amide, polyacrylate, polyethylene imine, and polyethylene oxide have been widely use. On the market, the following coagulating agents have been used in substantial amounts and are under the protected trade names such as "Praestol," "Sedipur," and "Nalco" by the following firms:

(1) Chemische Fabrik Stockhausen & Cie Krefelt Praestol 423K with cationic charge character; Praestol 5935 with anionic charge character.
(2) BASF, Ludwigshafen Sedipur SC 9228, with cationic charge character; Sedipur TF 5 with anionic charge character.
(3) Deutsche Nalco-Chemie GmbH, Frankfurt, subsidiary of Nalco-Chemical Company, Chicago Nalco 61-D-25 with cationic charge character; Nalco 673, with anionic charge character.

(c) Known Manipulative Steps

After addition of such a suitable coagulant agent, the muddy liquid can be fed to a wire cloth or screening belt of a draining zone whereby the water content will be reduced by about 60% and an aqueous sludge is obtained which can be subjected to a filtration process within a wire cloth press. But even the filter cake obtained as an end product still has a considerable water content. By the use of high pressures of the filter press and by long tarry times of the sludge respectively of the filter cake in the wire cloth press and screen belt press, attempts have indeed been made to reduce the water content as much as possible, but these measures lead to considerable costs of installations and of the process.

SUMMARY OF THE INVENTION

The invention is based on the task of enhancing the drainage of muddy liquids or sludges by moderately priced measures in order to achieve as dry as possible a filter cake.

Starting out from the known process of the above mentioned type, this will be achieved according to the invention by adding a coagulating agent for a second time to the aqueous sludge obtained after sedimentation and prior to the filtering process, whereby either a coagulating agent is used, the electrical charge character of which is opposite to the charge character of the coagulating agent added initially to the muddy liquid, or whereby at first an inorganic ionization agent opposed to the charge character of the coagulating agent added before the straining zone, and after intermixing a coagulating agent is added a second time, the electrical charge character of which is equal to that of the coagulating agent added initially to the muddy liquid.

As practical experiments have shown, by the addition of the additional coagulant, having the opposite charge character, respectively of the ionization agent having the opposite charge character, and again of the similar coagulant, the aqueous sludge obtains such a consistency, that it will lose water in the subsequent filter press much more strongly, so that a higher degree of drying of the filter cake will be achieved. This advantage does not only result in comparison to the known process, in case of which a coagulant with a charge character is added to the muddy liquid before the sedimentation process, but also as compared to an imaginable method of operation, according to which coagulants of both cationic as well as of anionic character are added to the muddy liquid even before sedimentation. It is decisive for the invention that the additional coagulant is added to the aqueous sludge only after the sedimentation process.

In case of the second embodiment of the process according to the invention, for example iron per chloride or aluminum sulfate can be used as anionic charge agents and lime or caustic soda solution as a cationic charge agents.

THE APPARATUS INVENTION

In order to carry out the process according to the first mentioned embodiment above, the invention proposes novel apparatus which consists of a coagulation chamber for the muddy liquid, a following revolving wire cloth or screening belt in the straining zone and a series connected screen belt press which is also termed as a wire cloth press. According to the invention, the apparatus is characterized by an arrangement, disposed at the discharge end of the screening belt in the straining zone for the addition of further coagulant to the aqueous sludge and by a following mixing chamber, which has a slot shaped outlet opening, lying transversely above the receiving screening belt of the screening belt press. According to the invention, the mixing chamber can have a collecting cone or funnel on the input side and a screw conveyor moving toward a buffer container and disposed in the bottom of the funnel, whereby the buffer container has the outlet opening.

In order to carry out the process according to the alternative type of operation, the invention provides development of the apparatus for continuous operation in such a way that an inorganic ionization agent and a mixing screw conveyer are disposed between the discharge end of the belt of the straining zone and the dosing means for adding the second coagulant.

According to yet another characteristic of the apparatus invention the screening belt of the straining zone and the two screening belts of the screening belt press are independent and are always separated on their operation as screening belts. In this case, the invention starts out from the observation, that on the top side in the straining zone and especially on the bottom side of the layer of sludge, a skin so to speak, forms, and a dirty, oily layer is built up on the screening belt, which also penetrates to a large extent into the screening belt. These skins of sludge or mud, and this oily layer, are each permeable to water only to a very slight extent and only through the use of a high pressure are they drained and thus represent an essential cause for a delay in the draining of the screening belt press. As a result of the transition to fresh screening press belts, provided according to the invention at the end of the straining zone, the oily layer formed in the straining zone is no longer conducted on into the screening belt press, and as a result of the intermixing of the sludge cake during the addition of the additional coagulant, a complete restructuring of the sludge cake is brought about at the same time, so that the "skins of sludge," developed on the screening belt of the straining zone do no longer reach the screening belt press.

Corresponding to the customary structure of screening belt presses, of a preliminary and a main pressing zone, in a further development of the invention, there are always provided two separate press screening belts or strips for each of these zones, so that here too, one passes over fresh screening belts, and does this preferably while restructuring the sludge cake.

As a result of these unusual and unobvious measures, a considerably quicker drainage will be achieved within the screening belt press up to the required degree of drying of the filter cake so that the screening belts can pass through the screening belt press at a considerably greater speed and a considerable increase in the volume and efficiency of performance will be achieved. This advantage will be supported in addition by the fact that in case of the filtering arrangement according to the invention, screening belts of variable size of the mesh can be used for the individual zones, i.e., the straining zone, the preliminary pressing and the main pressing zones, whereby the size of the mesh can always be adapted optimally to the conditions in the individual zones. Generally, a screening belt with a finer mesh can be used always for the succeeding zone, whereby the passing over to the screening belts with a variable relief surface contributes to a restructuring of the sludge cake and to a tearing open of skins of sludge that have developed.

BRIEF DESCRIPTION OF THE DRAWING

The process and the apparatus of the invention will be explained in the following on the basis of the drawing by way of example.

DESCRIPTION OF THE PREFERRED EMBODIMENTS

Figure 1:
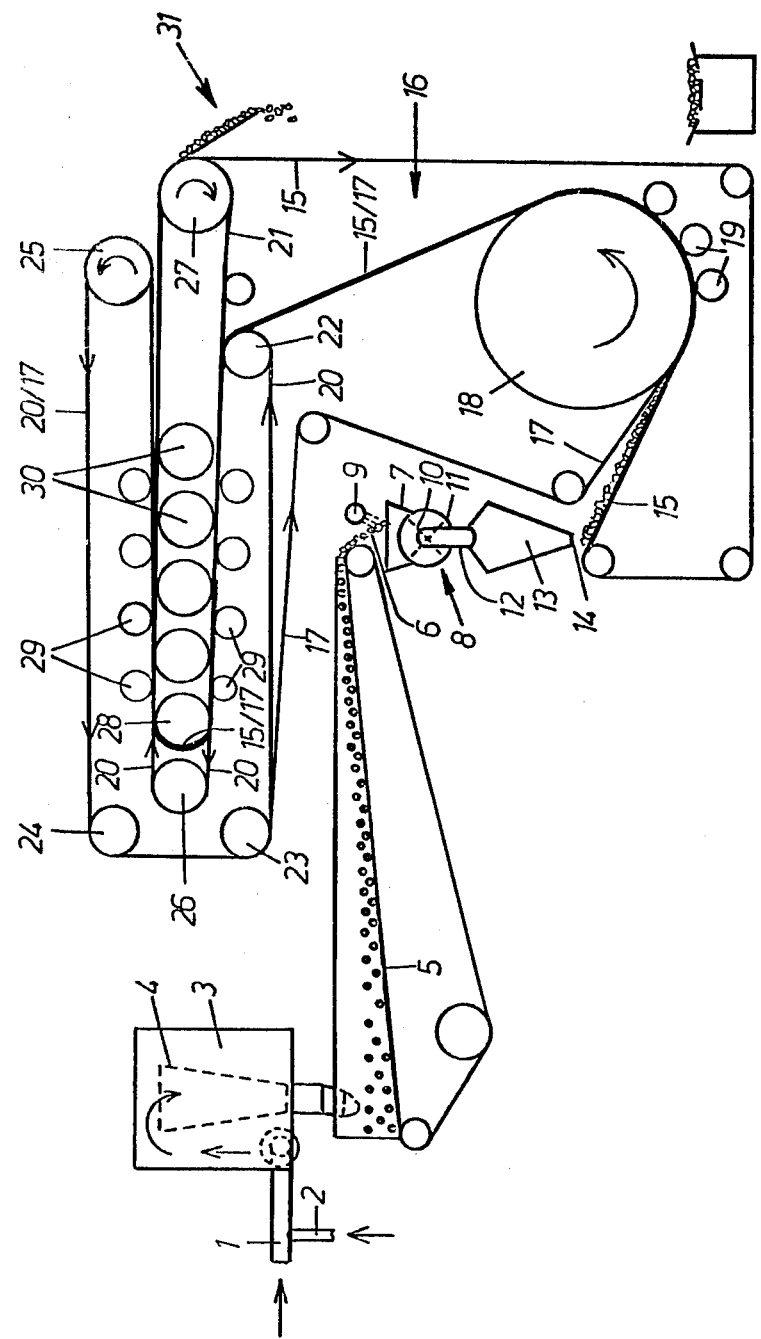
FIG. 1, is a schematic presentation of the whole arrangement for draining of muddy liquids in the case that a coagulant is added for a second time to the aqueous sludge after the straining zone.

The muddy liquid is conducted into the apparatus shown in FIG. 1 via a line 1, into which a feedline 2 empties and which is used for dosing a coagulant into a coagulation chamber 3. In chamber 3, the particles of solids that are to be removed are agglomerated by physical and electrical surface interaction with the molecules of the coagulant to form danger units capable of sedimentation. In short, coagulant thickens the liquid to form a thick slurry. The thickened slurry is deposited by means of an overflow funnel 4 on to a moving screening belt 5 which defines the straining zone and at the discharge end 6 of belt 5, there is provided scraper knife if desired as well as a slide for the dewatered aqueous sludge which is then dropped into receiving funnel 7 for feeding and mixing chamber 8. Above the funnel 7 there is provided a spray device 9 in the form of a spray tube and into spray device 9, an additional coagulant is added to the slurry, this added coagulant having the opposite electrical charge to the electrical charge of the coagulant fed into line 2 initially for the first thickening step in chamber 3. In the bottom of the funnel 7, a screw conveyor 10 is disposed in a horizontal position and projects laterally from the funnel is emerging forwarly from the surface plane of newly thickened sludge in mixing chamber 8. The screw conveyor 10 conveys the thickened sludge from the funnel 7 after the auxiliary addition of coagulant of opposite charge through the horizontal tube 11 and through the suceeding tube 12 which is bent downwardly to communicate then with buffer container 13. Buffer container 13 has a slit like outlet opening 14 on the bottom thereof which is oriented transversely to the running direction of the receiving belt, namely screening belt 15 which is one of the two series connected and two step screening belt press assembly 16. The sludge from the second thickening runs into the wedge formed by the nip of the two screening belts 15 and 17 and the point of entry below slit 14 is at the widest part of the nip. The two screening belts 15 and 17 wind together around a rotationally operated perforated drum 18 and are pressed strongly towards each other by contact rollers 19. The assembly of the screening belts 15 and 17 run into the wedge which is formed by the two supporting belts 20, 21 as is illustrated above the exit side of drum 18. The supporting belt 20 revolves around rollers 22, 23, 24, 25, 26, while the supporting belt 21 runs around the two rollers 27 and 28. In the area of the contact of rollers 29 and of the support rollers 30, the slurry is subjected to intensive pressing so that after this pressure a very dry filter cake is produced and is discharged at the discharge point 31 of the screening belt press.

Figure 2:
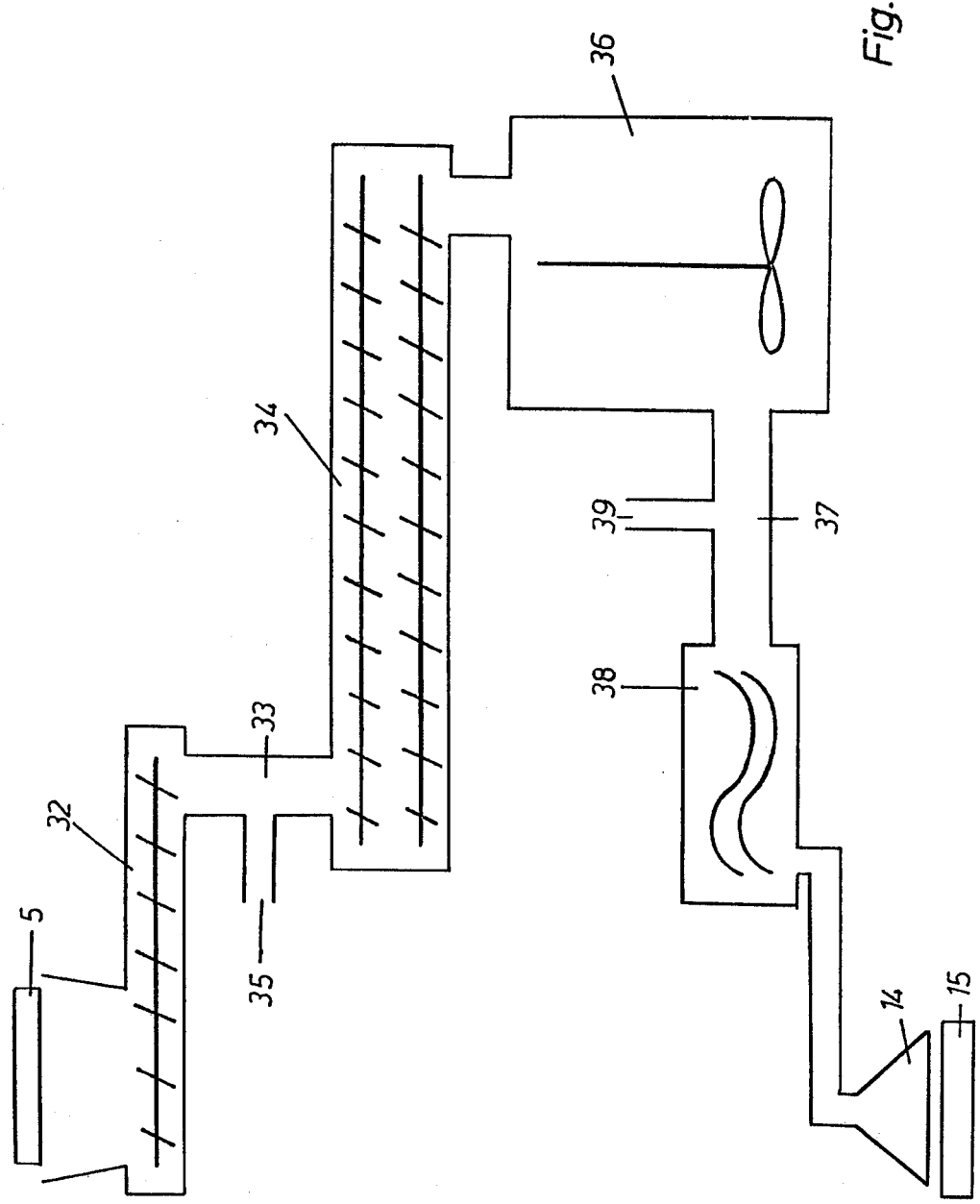
FIG. 2 shows an alternative embodiment of the parts of the apparatus disposed between straining zone and screening belt press in the case that first of all, an inroganic ionization agent and subsequently a coagulant is added there for a second time.

FIG. 2 shows a modified embodiment and illustrates processing of the sludge in a direction of view in FIG. 1 which is circulated at the right of FIG. 1. The modified embodiment in FIG. 2 shows the parts of the apparatus which are disposed between the discharge end of the screening belt 5 at the exit of the straining zone shown at the top of FIG. 2 and going into the direction of the receiving screening belt 15 of the series connected screening belt press, e.g., belts 15 and 17. The slurry drops from the screening belt 5 of the straining zone after the first thickening into a conveyor screw 32 and from there, the slurry drops by gravity into a stirring and mixing screw 34 via communicating dosing device 33 for the purpose of adding a coagulant, e.g., an ionization agent which will carry out a second coagulating step to further thicken the slurry. The dosing apparatus 33 consist of a section of pipe, into which the feed line 35 empties and through which the coagulating strong agent is added either as a liquid or as a powder. After intermixing, the slurry reaches a reaction tank 36 in which it reacts for about 2 to 8 minutes, and is then discharged by means of outlet and a suction pump for thickened slurry product. The pump 38 delivers the thick slurry to the screening belt 15 via nozzle as in FIG. 1 having a slit shaped outlet opening 14. The reaction tank 36 of FIG. 1 can be omitted in this FIG. 2 embodiment whenever the time of reaction of the slurry in the mixing screw 34 is adequate for the reaction of the coagulating ionization agent used in the second stage thickening with the slurry. The feed line 37 in this case is similar to feedline 39 and consists likewise of a pipe used with feedline 39 for insertion of the coagulant. In this case we are dealing with the same coagulant or with one with the same electrical charge character, as the coagulant which has already been added ahead of the straining zone. Thus the process using an ionization agent of opposite charge character is comparable but it may be added in the feed to apparatus 33 if desired.

Figure 3:
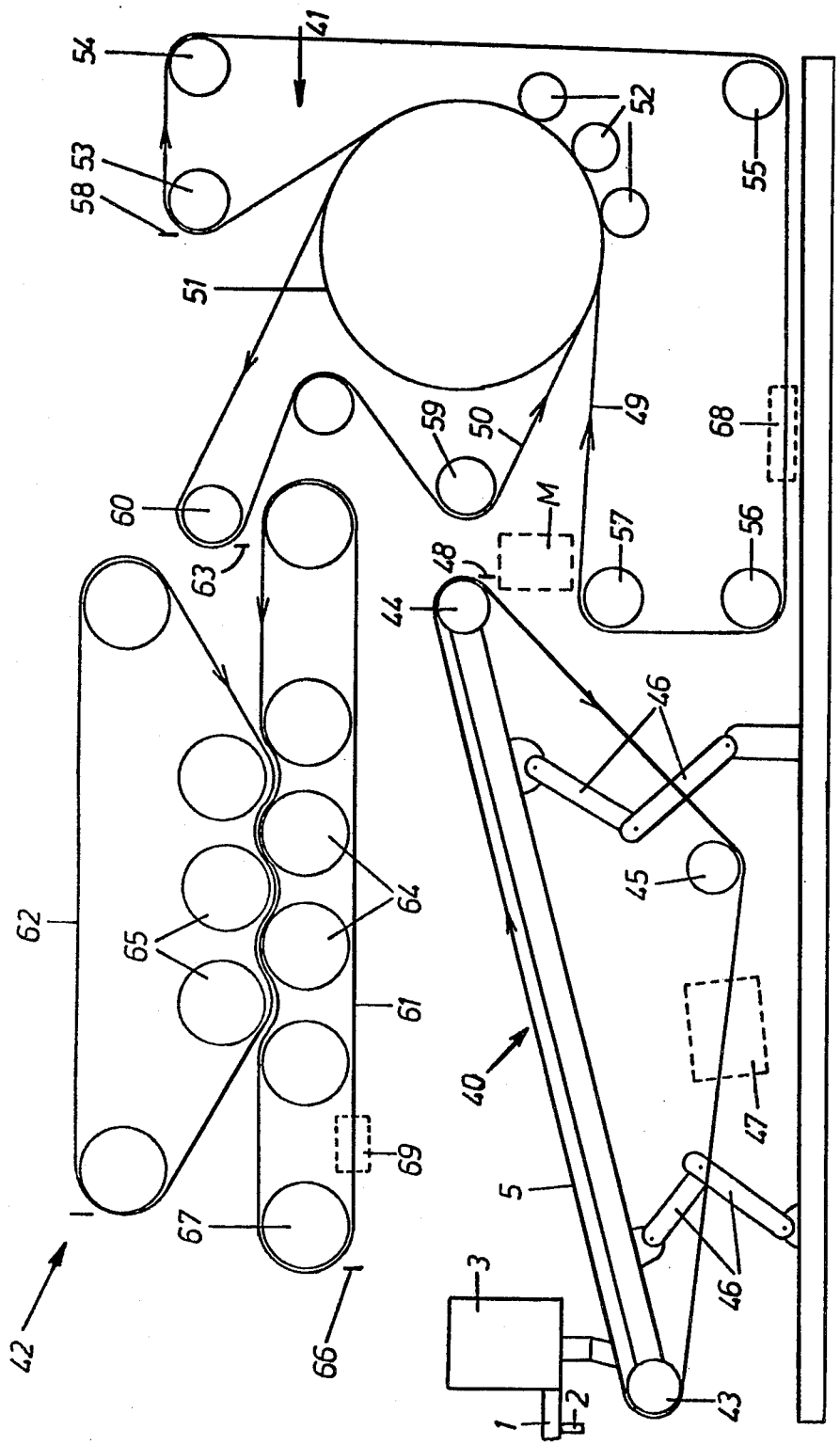
FIG. 3 shows a further embodiment of the entire apparatus.

FIG. 3 shows in systematic presentation a filter arrangement which consists of a straining zone 40 and a screening belt press with a preliminary pressing zone 41 and main pressing zone 42. The screening belt 5 for the straining zone revolves in said straining zone 40 via three reversing rollers 43, 44, 45 which move in the direction of the arrow of this Figure. The slope of the ascending upper part of the screening belt 5 and the height of the delivery end on the reversing roller 44 are adjustable by means of jointed supporting arms 46. The lower part of section of the screening belt 5 passes through cleaning arrangement 47 which is only schematically shown in this Fig.

In the cleaning arrangement of FIG. 3, attention is invited to the delivery end of the screening belt 5 for the straining zone in particular to the thickened sludge or slurry helped by a scraper 48 to drop into a mixer M for the dosing of an additional coagulant. In this case the structure is essentially the same as the mixing apparatus according to FIGS. 1 and 2. From mixer M, the slurry drops into a receiving wedge which is formed by the two revolving screening belts 49 and 50 which constitute the preliminary pressing zone 41 of the screening belt press. The two screening belts 49 and 50 together wind around a rotary driven perforated drum 51 against which they are pressed quite strongly by the contact rollers 52. The outside screening belt 49 returns by way of the outside reversing rollers 53, 54, 55, 56, 57, and a scraper 58 scrapes off any adhering slurry and throws it onto the inside screening belt 50, which runs by way of reversing rollers 59, 60 up to and above the receiving wedge which is formed by the two revolving screening belts 61 and 62 of the main zone 42 of the screening belt press. Here, as with scraper 58, a scraper or wiper 63 takes care of a complete as possible transfer of the pre-drained slurry cake to the screening belt 61 of the main pressing zone. In this pressing zone, the filter cake passes right through two linear groups of pressing and contact rollers 64 and 65. The dried filter cake leaves the screening belt press, again helped by a scraper 66 in the area of the reversing roller 67 of the belt 61. Cleaning arrangements 68, 69 are assiged to each of the individual screening belts.

Having thus disclosed the invention, what we claim is:

1. Apparatus for draining of muddy liquids comprising:
   an inlet feedline through which a muddy liquid passes to empty into a first coagulating chamber;
   a dosing device communicating with said inlet feedline to add a charged ionic coagulant selected from the group consisting of flocculating inorganic ionization agents and cationic coagulating agents into said inlet feedline;
   a first coagulating chamber communicating with said feedline fitted with an overflow funnel for mixing of ionic coagulant and muddy liquid entering from said feedline and in which thickening occurs to form a thick slurry which flows out of said overflow funnel and deposits onto an endless revolving screen belt where it is strained and dewatered;
   a revolving screen belt below said funnel having a scraper knife at its remote discharge end for aiding removal of strained and dewatered slurry onto a receiving funnel and thereafter into a second mixing and coagulating chamber by means of a screen conveyor means;
   a receiving funnel to receive the strained and dewatered slurry;
   a spray dosing device mounted over said receiving funnel which contains a second charged ionic coagulant opposite in charge to said first ionic coagulant;
   a spray dosing inlet pipe means into which said second charged ionic coagulant enters for later addition to the strained and dewatered slurry from the revolving screen belt to carry out a mixing in a second coagulating chamber;
   said second coagulant selected from the group consisting of coagulating inorganic ionization agents, anionic coagulating agents, and cationic coagulating agents;
   screw conveyor means conveying the mixtures of dewatered slurry and second charged coagulant to a second coagulating chamber for a second thickening;
   a second coagulating chamber which communicates with said spray dosing inlet pipe means for carrying out a second coagulation with the second coagulant and the strained and dewatered slurry;
   slit means below said second coagulating chamber for discharging thickened sludge;
   a receiving belt below said slit means wherein the slit of said slit means is transverse to the running direction of said belt to facilitate moving the second thickened slurry toward a two step screening belt for further dewatering by pressing and filtering;
   a two step screening belt assembly which is series connected to said receiving belt, said assembly comprising two screening belts coming together at a nip into which the second slurry enters from said receiving belt, a perforated drum about which said two screening belts wind and press towards each other, a drain and contact rollers pressing and belts towards each other adjacent to the exit side of said drain; and a series of longitudinally disposed supporting rollers for said two step screening belt assembly on opposite sides of said belts for progressively pressing the two belts with said sludge therebetween at greater pressures than said constant rollers of said perforated drum whereby a dry filter cake is discharged at the end of said two step screening belt assembly, the first step of said pressing occurring at the underside of some of the supporting rollers in one direction and the second step of said pressing occuring at the top side of the same supporting rollers in the other direction.

2. Apparatus as claimed in claim 1 wherein the spray dosing inlet pipe means for adding the second coagulant of opposite charge includes a section of pipe having a T section into which the feed for the thickened slurry from said receiving screen belt empties and the second coagulation chamber comprising a feeding screw conveyor emptying into a reaction tank having storing means, a pump, an outlet and a nozzle, said pump discharging said second thickened slurry from said reaction tank out of said outlet via said nozzle onto said two step screening belt assembly.

3. Apparatus as claimed in claim 2 wherein said endless receiving screening belt for straining said thickened slurry from said first coagulation chamber is provided three rollers and adjusting means to adjust the height of said receiving belt relative to said second coagulation chamber.

4. Apparatus as claimed in claim 2 wherein said second coagulating chamber comprises a mixing screw.

5. Apparatus as claimed in claim 2 wherein said two press belt assembly is provided with additional rollers for said two screening belts of said two press belt assembly which leave the exit side of said perforated drum for additional pressing of the sludge therebetween at the exit side, said additional rollers located over said drum and wherein an exit scraper for the two press belt assembly is provided to aid the removal of dry solids.

* * * * *